United States Patent
McClanahan

(10) Patent No.: US 7,333,634 B2
(45) Date of Patent: Feb. 19, 2008

(54) METHOD AND APPARATUS FOR A VELOCITY DETECTION SYSTEM USING OPTICAL GROWTH RATE

(75) Inventor: Stephen A. McClanahan, Tampa, FL (US)

(73) Assignee: University of South Florida, Tampa, FL (US)

(*) Notice: Subject to any disclaimer, the term of this patent is extended or adjusted under 35 U.S.C. 154(b) by 368 days.

(21) Appl. No.: 11/161,065

(22) Filed: Jul. 21, 2005

(65) Prior Publication Data

US 2006/0034489 A1    Feb. 16, 2006

Related U.S. Application Data

(60) Provisional application No. 60/521,925, filed on Jul. 21, 2004.

(51) Int. Cl.
*G06K 9/00* (2006.01)
*H04N 9/47* (2006.01)
*G01P 3/36* (2006.01)

(52) U.S. Cl. .................. 382/107; 348/148; 356/27

(58) Field of Classification Search .............. 382/100, 382/107, 103; 348/143, 148, 154, 155; 356/27, 356/29
See application file for complete search history.

(56) References Cited

U.S. PATENT DOCUMENTS

| | | | |
|---|---|---|---|
| 6,675,121 B1 * | 1/2004 | Hardin et al. ............... | 702/142 |
| 2004/0252862 A1 * | 12/2004 | Camus et al. ............... | 382/104 |

* cited by examiner

*Primary Examiner*—Yon J. Couso
(74) *Attorney, Agent, or Firm*—Molly Sauter; Smith & Hopen P.A.

(57) ABSTRACT

The present invention is a velocity detection system and method. In accordance with an embodiment of the invention, a series of still images of moving automobiles are taken at known intervals. An Image processor algorithm is used to determine local features of the moving automobile and in conjunction with known optical formulas, the velocity of the moving object can be determined. Once the velocity is determined, all of the moving automobiles are highlighted with their calculated velocity on a liquid crystal display screen. Images may be exported into flash memory for future reference.

26 Claims, 1 Drawing Sheet

METHOD AND APPARATUS FOR A VELOCITY DETECTION SYSTEM USING OPTICAL GROWTH RATE

CROSS REFERENCE TO RELATED APPLICATIONS

This application claims priority to U.S. Provisional Patent Application No. 60/521,925, "Method and Apparatus for a Velocity Detection System Using Optical Growth Rate", filed Jul. 21, 2004.

BACKGROUND OF INVENTION

A variety of velocity detection systems and techniques are known in the art. Law enforcement agencies commonly use velocity detection systems, for instance, to determine velocities of moving vehicles. Velocity detection systems known in the art utilize RADAR (Radio Detection and Ranging) or LIDAR (Light Detection and Ranging) to determine the velocity of an object in a short amount of time and to a degree of accuracy.

The current technology, including RADAR and LIDAR systems, emit radio waves, laser beams, and/or sound waves, which reflect off the moving vehicles back to the detection system where the velocities of the moving vehicles are subsequently determined. This method, however, requires the cooperation of targeted vehicles, meaning that the signal must be reflected back to the detection system from the vehicle to enable the calculation of the vehicle velocity. The signal that is transmitted to the moving objects by the detection system can be detected, deflected, and jammed, using signal detectors, deflectors, and jamming devices known in the art, making the vehicle a non-cooperating vehicle. Since the energy being transmitted to the object is targeted, RADAR/LIDAR detectors and jammers can alert the moving vehicle to or even destroy the RADAR/LIDAR velocity reading. As a result, drivers equipped with jamming technology and detectors adapted to the RADAR/LIDAR systems known the art can prevent the velocity of their vehicle from being detected. As such, the drivers may evade law enforcement officials and continue to drive at unsafe speeds, without fear of adverse legal consequences.

Velocity detection systems are known in the art that are based on optics, commonly employing a digital camera. Optical based systems cannot be detected or deflected. However, optical based systems currently known in the art rely on conditions that are only true for one location. In a particular example of an optical system know in the art, successive images are taken of a moving vehicle and related to a predetermined distance, thereby allowing the determination of the duration of time required for the vehicle to travel a specific distance. The vehicle's velocity can then be calculated. When the optical systems currently known in the art are moved to another location, the system must be reprogrammed to accommodate the new location. As such, these systems are not portable. Other optical systems are known that rely on multiple cameras to gain a sense of depth which can then be used to calculate velocity. Due to the design of these systems, they are also stationary and require complex computations.

Accordingly, what is needed in the art is a method and apparatus that detects, calculates, and records the velocities of moving objects that is easily adaptable to plurality of settings, including, but not limited to moving objects equipped with detection and jamming devices.

However, in view of the prior art considered as a whole at the time the present invention was made, it was not obvious to those of ordinary skill in the pertinent art how the identified need could be fulfilled.

SUMMARY OF INVENTION

This present invention relates to a velocity detection system and a method of using the same. More particularly, the invention relates to a velocity detection system that captures a plurality of images of selected moving targets at successive time periods and calculates their velocities from the optical growth rate exemplified in the plurality of images.

In accordance with an embodiment of the present invention, a method for determining the velocity of a moving object is provided. The method includes locating an image capture plane. The location of the image capture plane may be constant, as in the case where the velocity detection system is stationary, or the image capture plane may be changing, as would be the case when the velocity detection system is mounted on a moving vehicle, such as a patrol car. After the image capture plane has been determined, the method includes capturing a first image at a first time interval from the image capture plane location, the first image comprising an image of at least one moving object, capturing a second image at a second time interval from the image capture plane location, the second image comprising an image of at least one moving object and wherein the second time interval is greater than the first time interval, determining the rate of growth of the image of the at least one moving object based on a dimensional comparison between the image of the at least one moving object from the first image and the image of the at least one moving object from the second image and calculating the velocity of the at least one moving object based on the rate of growth of the image of the moving object relative to the image capture plane.

While it is possible to carry out the method of the invention by comparing only two images, in a specific embodiment, the present invention captures a plurality of images of the at least one moving object at a plurality of successive time intervals determines the growth rate and associated velocity of the moving object using the plurality of images. The plurality of captured images may then be stored on an electronic storage medium, along with the calculated velocities and time stamps.

When determining the rate of growth of the image of the at least one moving object, the method in accordance with the present invention makes a dimensional comparison between the first image and the second image. Making a dimensional comparison in accordance with the present invention further includes, measuring an image dimension of the at least one moving object from either the first image or the second image, estimating the actual dimension of the at least one moving object, determining a threshold level based on the estimated actual dimension of the at least one moving object, comparing the image dimension of the at least one moving object with the threshold level to determine the approximate distance of the at least one moving object from the image capture plane and determining the rate of growth of the image of the at least one moving object by comparing the image dimension of the at least one moving object of the first image with the image dimension of the at least one moving object of the second image and the approximate distance of the at least one moving object from the image capture plane.

Estimating the actual dimension of the at least one moving object further comprises identifying a substantially constant dimension within the physical environment of the at least one moving object and comparing the dimension of the image of the at least one moving object to the identified substantially constant dimension. In an exemplary embodiment, the at least one moving object is a moving vehicle and the dimension of the image of the at least one moving object is the width of the vehicle. In accordance with this embodiment, the substantially constant dimension within the physical environment of the at least one moving object is the width of a roadway lane.

To verifying the calculated velocity of the at least one moving object, the method may further include the step of comparing subsequent calculated velocities of the at least one moving object based upon images captured at successive time intervals.

The image dimension that is used to determine the rate of growth of the image, may be the height, width, area, or other measurable image dimension. Accordingly, measuring an image dimension of the at least one moving object from either the first image or the second image further includes employing a computer vision algorithm to measure an image dimension from said image. As such, a computer vision algorithm is used to extract the digital data from the image to allow the measurement of the image dimension.

When the velocity detection system is moving, the location of the image capture plane is changing. As such, the rate of change of the location of the image capture plane must be taken into account in the calculation of the velocity of the moving object. The rate of change of the location of the image capture plane can be determined by employing a global positioning system or altimeter coincident with the velocity detection system. The velocity of the moving object is then calculated based on the rate of growth of the image of the moving object relative to the rate of change of the location of the image capture plane.

The images that are captured by the velocity detection system may include more than one moving object for which a velocity determination is desired. In the case where the velocity detection system itself is moving, it is necessary to identify the objects that are actually moving, versus the stationary objects that appear to be moving due to the movement of the velocity detection system. Accordingly, it is necessary to determine the rate of change of the location of the image capture plane. This rate of change may be determined by using a global positioning system (GPS) as previously described. An expected growth rate for a stationary object is then determined based on the rate of change of the image capture plane. By comparing the expected growth rate for a stationary object to the rate of growth of an object in the image, it can be determined whether or not an object is moving or stationary. After the stationary objects are identified, the image, along with the corresponding calculated velocities of the moving objects in the image may be displayed to the user, such as on a liquid crystal display.

In a specific embodiment for determining the velocity of a moving vehicle, the present invention includes the steps of, locating an image capture plane, capturing a first image of a moving vehicle at a first time interval from the image capture plane location, capturing a second image of the moving vehicle at a second time interval from the image capture plane location, wherein the second time interval is greater than the first time interval, measuring the width of the vehicle from the first captured image, determining the approximate distance of the moving vehicle from the image capture plane location by comparing the width of the vehicle from the first captured image with the width of the roadway, measuring the height of the vehicle from the first captured image, measuring the height of the vehicle from the second captured image, determining the change in height of the image of the moving vehicle based on a comparison between the height of the vehicle in the first image and the height of the vehicle in the second image and calculating the velocity of the moving vehicle based on the change in height of the image of the moving vehicle and the approximate distance of the moving vehicle from the image capture plane location.

A system for determining the velocity of a moving object in accordance with the present invention includes, a machine vision camera to capture a plurality of images at a plurality of successive time intervals, the plurality of images further comprising an image of at least one moving object and a machine vision processor to determine the rate of growth of the image of the at least one moving object based on a dimensional comparison between at least two of the plurality of images captured by the machine vision camera and to calculate the velocity of the at least one moving object based on the determined rate of growth of the image of the at least one moving object.

In a particular embodiment, the machine vision camera is a machine vision smart camera. Various machine vision system are known in the art which are considered within the scope of the present invention.

In a specific embodiment, the machine vision processor further comprises an algorithm to measure an image dimension of the at least one moving object from an image, estimate the actual dimension of the at least one moving object, determine a threshold level based on the estimated actual dimension of the at least one moving object, compare the image dimension of the at least one moving object with the threshold level to determine the approximate distance of the at least one moving object from the machine vision camera, and determine the rate of growth of the image of the at least one moving object by comparing the image dimension of the at least one moving object of the first image with the image dimension of the at least one moving object of the second image and the approximate distance of the at least one moving object from the machine vision camera.

The system in accordance with the present invention may further include a visual output to display the captured images and the results of the calculated velocity to a user of the system. Additionally, the system may include a user interface in circuit communication with the machine vision camera and the machine vision processor to allow the user to control many features of the vision system. An image storage medium to store the plurality of captured images and the calculated velocities may be included, in addition to a global positioning system.

In accordance with the present invention a velocity detection system is provided comprising a camera in conjunction with an image processor to capture moving objects positioned in the visual range of the camera. With this invention, the change in size of the image is used to calculate the velocity of the moving object. As such, the present invention relates to an optical ranging system for determining the velocity of incoming and outgoing non-cooperating vehicles.

The present invention provides a portable velocity detection system that can detect, track, and calculate the growth rate of multiple objects simultaneously, convert the growth rates to velocities, and store those velocities and time-stamped images for later reference on storage media. As such, the present invention determines the velocity of a moving object without the cooperation of the moving object being detected.

BRIEF DESCRIPTION OF THE DRAWINGS

For a fuller understanding of the invention, reference should be made to the following detailed description, taken in connection with the accompanying drawings, in which.

DETAILED DESCRIPTION OF THE PREFERRED EMBODIMENT

Figure 1:
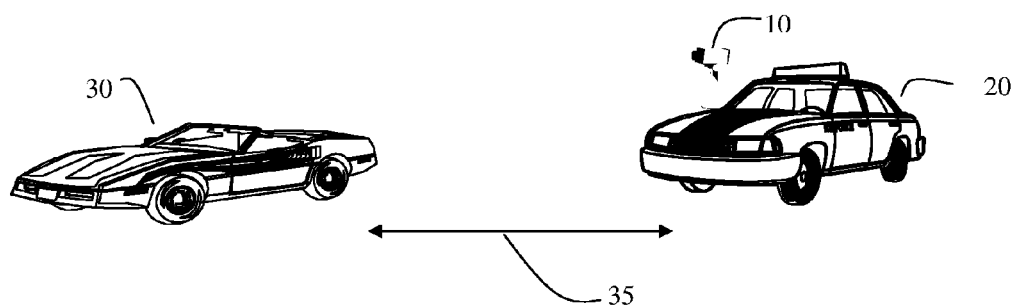
FIG. 1 illustrates the velocity detection system in accordance with the present invention.

With reference to FIG. 1, in a particular embodiment, the velocity detection system 10 is mounted on a vehicle 20. The vehicle 20 is moving at a velocity $V_1$ (ft./sec.) The targeted moving object 30 is traveling at an unknown velocity $V_2$ (ft./sec.) and is an unknown distance r 35 from the detection vehicle 20. The location of the velocity detection system 10 determines the image capture plane location, and the unknown distance r is the distance from the image capture plane location to the moving object. Though the velocity detection system 10 is mounted on the vehicle 20, this is not considered a limitation, and the system could also be portable, stationary, and independent from the detection vehicle 20.

In a particular embodiment, the velocity detection system 10 is used to determine the velocity of a moving vehicle 30 traveling on a common roadway. It is envisioned that this system could be employed in a variety of situations requiring velocity detection. This specific embodiment is exemplary in nature and is not intended to limit the scope of the present invention.

In the exemplary embodiment, the velocity detection system is used to determine the velocity $V_2$ of the moving object 30 from a plurality of images collected by velocity detection system 10. The images of the object are taken at successive time intervals and stored on an electronic medium.

From geometric optics, it can be shown that the height $h_i$, or area $A_i$, of the image of moving object 30 observed by the velocity detection system 10 can be related to the actual height $h_o$, or area $A_o$, of object 30 and the distance r 35 between the detection vehicle 20 and the targeted moving object 30. It is a known mathematical formula that the relationship between $h_i$, $h_o$, $A_i$, $A_o$ and r can be computed as a function of the focal length, f, of the lens. This relationship is:

$$h_i/f = h_o/r;\ A_i/f^2 = A_o/r^2 \tag{1}$$

Differentiating the above equation with respect to time yields:

$$(h_{i2} - h_{i1})/(f\Delta t) = [-(h_{02} - h_{01})/(r^2 \Delta t)]r \tag{2}$$

$$= (-h_i/fr)[(r_2 - r_1)/\Delta t]$$

Therefore:

$$(h_{i2} - h_{i1})/(h_{i2}\Delta t) = -(r_2 - r_1)/(r\Delta t) \tag{3}$$

$$= -(V_2 - V_1)/r$$

$$= -(A_{i2} - A_{i1})/(2A_{i2}\Delta t)$$

where variables with 1 and 2 subscript denote values for the first and second instance of the variable with time $\Delta t$ between instance 1 and 2, and where $V_1$ and $V_2$ are the respective velocities of detection system 10 and moving object 30.

The velocity detection system in accordance with the present invention determines the rate of growth of the moving object. Therefore, $$(h_{i2} - h_{i1})/(h_{i2}\Delta t)$$

will be determined.

The velocity detection system 10 may be either moving or stationary. If the velocity detection system is moving, the velocity of the detection system 10, $V_1$, is known from a GPS receiver or altimeter associated with the velocity detection system 10.

To determine the velocity, $V_2$, of the moving object 30, two subsequent image dimensions must be determined. Various dimensional characteristics may be used for the calculation of the moving object velocity. In a particular embodiment, the height of the image of the moving object 30 at a first time period, $h_{i1}$, and the height of the image of the moving object 30 at a second time period, $h_{i2}$, are used as the dimensional elements for the calculation. If the time between subsequent calculations is small enough, then $V_2$, the velocity of the moving object 30 between the two time periods of the image capture, can be considered constant. Since r changes with a constant velocity, any velocity $V_2$ will have a unique closing rate as moving object 30 moves away from or towards the detection system 10.

Before the velocity $V_2$ of moving object 30 can be determined, the velocity detection system 10 must first locate the moving object 30 and calculate its respective dimension. This dimension may include the height, width, and or area of the captured image of the moving object 30. To accomplish locating and tracking moving object 30, different computer vision algorithms as known in the art are within the scope of the present invention. A variety of algorithms are known in the art for processing images. Each of these algorithms possesses individual strengths in processing time, accuracy, and precision.

To track moving objects in the capture image, first the local features of the moving object must be located. The image is broken down into segments and pixel comparisons are made to extract local features of the image. In a particular embodiment, as described in the mathematical discussion above, a horizontal dimension for a local feature of the moving object 30 is detected and measured from the images, resulting in measurements for $h_{i2}$ and $h_{i1}$.

It is not enough just to know two dimensional measurements, $h_{i2}$ and $h_{i1}$, to determine the velocity $V_2$. Since all images growth rate is the same as it is moving towards the detector 10, there is overlap between different velocities's closing rates. For example, a moving object 30 with a high velocity $V_2$ and high value of r would appear to have a similar closing rate of a different slower moving object at a smaller r value. For this reason, the velocity $V_2$ cannot be precisely measured by just looking at the growth rate of a particular dimension of the optical image. Therefore, characteristics of the optical image must also be taken into consideration.

When the dimension of the optical image is determined, it can be compared to a threshold to determine the relative position of the moving object 30 from the velocity detection system 10. When the dimension measured from the image of the moving object 30 is relatively small, it can be said that the moving object 30 is far away from the velocity detection system 10 signifying a large value of r. When the dimension measured from the optical image of the moving object 30 is relatively large, it can be said that moving object 30 is close to the velocity detection system 10 signifying a small value of r.

To determine what value represents a relatively small and large value for a particular dimension of the optical image, an assumption must be made of the moving object's actual physical dimensions. Since all vehicles travel in set lanes on roadways, a general statement can be made that a vehicle's approximate width is slightly smaller than the width of a roadway lane. With this assumption, an approximate distance r can be estimated for moving object 30.

Referring to Equation (3), the only variable remaining is the velocity $V_2$ of moving object 30, and as such, the velocity of moving object 30 can be calculated.

In accordance with an additional embodiment, after calculating the moving object velocity $V_2$, additional computations are accomplished within fractions of a second to verify the calculated velocity of moving object 30. If the velocities calculated are within a respectable threshold of subsequent calculations, then the calculated velocity $V_2$ can be considered correct.

Two particular embodiments of the velocity detection system and method in accordance with the present invention include when: (1) The velocity detection system is not moving, $V_1=0$, and (2) when the velocity detection system is moving at a known velocity, $V_1$ greater than 0.

When the velocity detection system 10 is not moving, the only significantly moving object is the moving object 30. Additionally, there may be a plurality of moving objects 30 captured in a plurality of images by the image detection system 10. A velocity may be calculated for each of these moving objects 30 as previously described. In the case where the velocity detection itself is not moving, a dimension of the moving object is identified and tracked to enable the velocity detection system to calculate the velocity, $V_2$, or one or more of the moving objects.

In an additional embodiment, the velocity detection system 10, itself, s moving. This situation is common when the velocity detection system 10 is mounted on a detection vehicle 20 that is moving. In this embodiment, the velocity of the detection system 10 $V_1$ is greater than zero and the image capture plane location is moving as defined by the detection system. When images are captured by a velocity detection system 10 that is moving, it appears that not only the moving objects are moving, but also that the stationary objects are moving as observed by the change in dimensions of the stationary objects due to the movement of the velocity detection system 10 relative to the stationary objects. In this case, some of the moving objects captured in the images are stationary but appear to be moving relative to the velocity detection system 10. To account for the movement of the velocity detection system 10, a GPS (Global Positioning System) or altimeter may be installed within the detection system to measure the velocity $V_1$ of the velocity detection system 10. Looking back at equation (3), when $V_2=0$ and $V_1$ is greater than zero, all other variables in the equation, except r, are known. Therefore, for stationary objects a calculated growth rate for the object can be determined. In order to single out the moving objects 30 with individual velocities from the stationary objects, the calculated growth rate for any local feature detected can be compared to the expected growth rate for stationary objects. If the expected growth rate is not equal to the calculated growth rate within a certain threshold, then the unequal growth rate belongs to a moving object 30.

Figure 2:
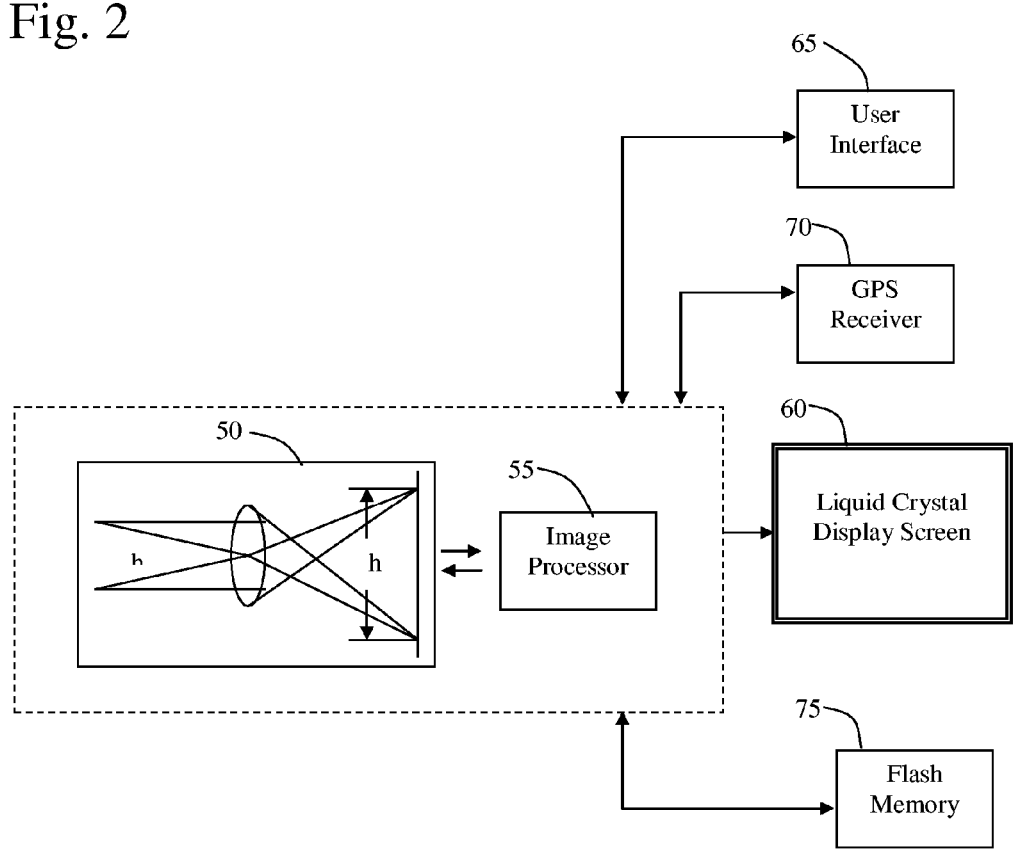
FIG. 2 provides an illustrative schematic of the velocity detection system in accordance with the present invention.

With reference to FIG. 2, in a specific embodiment, the velocity detection system 10 in accordance with the present invention includes a machine vision camera 50, and image processor 55.

A machine vision smart camera, as known in the art, is an integrated machine vision system which in addition to imaging capabilities also includes an embedded processor and appropriate input and output devices. The smart camera is a self-contained unit that includes the imager as well as the processing and I/O capabilities. The smart camera is capable of being programmed to handle many imaging algorithms and application functions as required by the particular application. The system may also include a liquid crystal display screen 60, a user interface 65 and a GPS receiver 70.

In an alternative embodiment providing greater flexibility and the capability to handle a wider range of applications and multiple camera inputs, the image capture could be provided by a machine vision based minicomputer. Machine vision based minicomputer systems known in the art include a camera with the capability to interface directly to a personal computer, or a system designed based on a frame grabber or other intelligent image processing board or vision engine that plugs into the personal computer.

In an exemplary embodiment, a simple machine vision system includes, an optical sensor, black-and-white camera, lighting, a camera interface card for computer, commonly known as a "framegrabber", computer software to process the captures images and digital signal hardware or a network connection to report results. Accordingly, the machine vision system in accordance with the present invention may be a machine vision smart camera or a machine vision based minicomputer. The benefit of utilizing a smart camera system is that the smart camera has an embedded image processor. Therefore, there is no need to interface with the video from the camera directly via a frame grabber or similar device. The machine vision algorithms used to track the growth of moving object 30 can simply be downloaded to the image processor of the smart camera.

The video out from the smart camera is routed to a liquid crystal display screen so that the user of the velocity detection system can visually see what the detection system has processed and calculated. The smart camera provides a layer over the video collected by the camera displaying the results of the image processor on the liquid crystal display 60. In this layer, the present invention displays the velocities of all the moving objects 30 within its detection range. The moving object 30 with the greatest velocity is especially displayed so that the moving object with the greatest velocity can be easily determined. While tracking moving object 30, in addition to displaying its current velocity, the highest velocity recorded is also displayed.

Upon request by the user via a user interface 65, a series of still images may be routed to flash memory 75 for reference at a later time.

Various means are within the scope of the present invention to provide power for the system. In a particular embodiment, power is supplied to the system utilizing a battery source which can be tied into a vehicle's cigarette lighter when used in a vehicle based detection system or carried portably when charged.

It will be seen that the advantages set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween. Now that the invention has been described,

What is claimed is:

1. A method for determining the velocity of a moving object, the method comprising the steps of:
   locating an image capture plane;
   capturing a first image at a first time interval from the image capture plane location, the first image comprising an image of at least one moving object;
   capturing a second image at a second time interval from the image capture plane location, the second image comprising an image of at least one moving object and wherein the second time interval is greater than the first time interval;
   determining the rate of growth of the image of the at least one moving object based on a dimensional comparison between the image of the at least one moving object from the first image and the image of the at least one moving object from the second image; and
   calculating the velocity of the at least one moving object based on the rate of growth of the image of the moving object relative to the image capture plane.

2. The method of claim 1, wherein the image capture plane location is constant.

3. The method of claim 1, further comprising capturing a plurality of images of the at least one moving object at a plurality of successive time intervals from the image capture plane location.

4. The method of claim 1, further comprising storing the captured images on an electronic storage medium.

5. The method of claim 1, wherein the step of determining the rate of growth of the image of the at least one moving object based on a dimensional comparison between the first image and the second image, further comprises:
   measuring an image dimension of the at least one moving object from either the first image or the second image;
   estimating the actual dimension of the at least one moving object;
   determining a threshold level based on the estimated actual dimension of the at least one moving object;
   comparing the image dimension of the at least one moving object with the threshold level to determine the approximate distance of the at least one moving object from the image capture plane; and
   determining the rate of growth of the image of the at least one moving object by comparing the image dimension of the at least one moving object of the first image with the image dimension of the at least one moving object of the second image and the approximate distance of the at least one moving object from the image capture plane.

6. The method of claim 5, wherein the step of estimating the actual dimension of the at least one moving object further comprises identifying a substantially constant dimension within the physical environment of the at least one moving object and comparing the dimension of the image of the at least one moving object to the identified substantially constant dimension.

7. The method of claim 6, wherein the at least one moving object is a moving vehicle, the dimension of the image of the at least one moving object is the width of the vehicle and the substantially constant dimension within the physical environment of the at least one moving object is the width of a roadway lane.

8. The method of claim 1, further comprising the step of verifying the calculated velocity of the at least one moving object by comparing subsequent calculated velocities of the at least one moving object based upon images captured at successive time intervals.

9. The method of claim 5, wherein the step of measuring an image dimension of the at least one moving object from either the first image or the second image further comprises employing a computer vision algorithm to measure an image dimension from said image.

10. The method of claim 1, wherein the image capture plane location is changing.

11. The method of claim 10, further comprising the steps of:
    measuring the rate of change of the location of the image capture plane; and
    calculating the velocity of the at least one moving object based on the rate of growth of the image of the at least one moving object relative to the rate of change of the location of the image capture plane.

12. The method of claim 1, wherein the at least one moving object further comprises a plurality of moving objects.

13. The method of claim 1, wherein the image capture plane location is changing and the at least one moving object further comprises a plurality of moving objects.

14. The method of claim 13, wherein the plurality of moving objects further comprises at least one stationary object having a rate of growth resulting from the change in location of the image capture plane.

15. The method of claim 14, further comprising the step of identifying the at least one stationary object from the plurality of moving objects.

16. The method of claim 15, further comprising the steps of:
    determining a rate of change of the location of the image capture plane;
    determining an expected growth rate for a stationary object based on the rate of change of the location of the image capture plane; and
    comparing the expected growth rate for a stationary object to the rate of growth of the at least one stationary object to identify the at least one stationary object having a rate of growth substantially equal to the expected growth rate.

17. The method of claim 5, wherein the image dimension is selected from the group consisting of the height of the image, the width of the image and the area of the image.

18. The method of claim 1, further comprising the step of displaying the velocity of the at least one moving object to a user.

19. A method for determining the velocity of a moving vehicle, the method comprising the steps of:
- locating an image capture plane;
- capturing a first image of a moving vehicle at a first time interval from the image capture plane location;
- capturing a second image of the moving vehicle at a second time interval from the image capture plane location, wherein the second time interval is greater than the first time interval;
- measuring the width of the vehicle from the first captured image;
- determining the approximate distance of the moving vehicle from the image capture plane location by comparing the width of the vehicle from the first captured image with the width of the roadway;
- measuring the height of the vehicle from the first captured image;
- measuring the height of the vehicle from the second captured image;
- determining the change in height of the image of the moving vehicle based on a comparison between the height of the vehicle in the first image and the height of the vehicle in the second image; and
- calculating the velocity of the moving vehicle based on the change in height of the image of the moving vehicle and the approximate distance of the moving vehicle from the image capture plane location.

20. A system for determining the velocity of a moving vehicle, the system comprising:
- a machine vision camera to capture a plurality of images at a plurality of successive time intervals, the plurality of images further comprising an image of at least one moving object;
- a machine vision processor to determine the rate of growth of the image of the at least one moving object based on a dimensional comparison between at least two of the plurality of images captured by the machine vision camera and to calculate the velocity of the at least one moving object based on the determined rate of growth of the image of the at least one moving object.

21. The system of claim 20, wherein the machine vision camera is a machine vision smart camera.

22. The system of claim 20, wherein the machine vision processor further comprises an algorithm to measure an image dimension of the at least one moving object from an image, estimate the actual dimension of the at least one moving object, determine a threshold level based on the estimated actual dimension of the at least one moving object, compare the image dimension of the at least one moving object with the threshold level to determine the approximate distance of the at least one moving object from the machine vision camera, and determine the rate of growth of the image of the at least one moving object by comparing the image dimension of the at least one moving object of the first image with the image dimension of the at least one moving object of the second image and the approximate distance of the at least one moving object from the machine vision camera.

23. The system of claim 20, further comprising a visual output to display the captured images and the results of the calculated velocity.

24. The system of claim 20, further comprising a user interface in circuit communication with the machine vision camera and the machine vision processor.

25. The system of claim 20, further comprising an image storage medium to store the plurality of captured images and the calculated velocities.

26. The system of claim 20, further comprising a global positioning system.

* * * * *